(12) United States Patent
Waynick

(10) Patent No.: US 7,655,055 B2
(45) Date of Patent: Feb. 2, 2010

(54) BIOFUEL

(75) Inventor: John Andrew Waynick, Lantana, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/859,532

(22) Filed: Sep. 21, 2007

(65) Prior Publication Data

US 2008/0120899 A1 May 29, 2008

Related U.S. Application Data

(60) Provisional application No. 60/846,324, filed on Sep. 21, 2006.

(51) Int. Cl.
C10L 1/18 (2006.01)
C10L 1/22 (2006.01)
C10L 10/14 (2006.01)

(52) U.S. Cl. ............................ 44/307; 44/400; 44/389

(58) Field of Classification Search ............... 44/388, 44/387, 307, 400, 389; 554/213
See application file for complete search history.

(56) References Cited

U.S. PATENT DOCUMENTS

| | | | |
|---|---|---|---|
| 5,578,090 A | 11/1996 | Bradin | |
| 6,018,063 A * | 1/2000 | Isbell et al. | 554/213 |
| 6,316,649 B1 | 11/2001 | Cermak et al. | |
| 6,468,319 B1 * | 10/2002 | Yeh et al. | 44/388 |
| 6,489,496 B2 | 12/2002 | Barnhorst et al. | |
| 6,554,876 B1 * | 4/2003 | Tack et al. | 44/387 |
| 2004/0006912 A1 | 1/2004 | Krull et al. | |
| 2004/0010072 A1 | 1/2004 | Krull et al. | |
| 2004/0226216 A1 | 11/2004 | Krull et al. | |
| 2005/0016060 A1 | 1/2005 | Krull et al. | |
| 2005/0113266 A1 | 5/2005 | Krull et al. | |
| 2005/0126072 A1 | 6/2005 | Krull et al. | |

OTHER PUBLICATIONS

Isbell, et al., "Acid-Catalyzed Condensation of Oleic into Estolides and Polyestolides," J.Am. Oil Chem. Soc. 1994, vol. 71, No. 1, pp. 169-174.
Cermack, et al., "Synthesis and Physical Properties of Cuphea-Oleic Estolides and Esters," J.Am. Oil Chem. Soc. 2004, vol. 81, No. 3, pp. 298-303.
Isbell, et al., "Physical Properties of Estolides and their Ester Derivatives," Ind. Crops Prod., 2000, 13, pp. 11-20.
Erhan, et al., "Estolide Production with Modified Clay Catalysts and Process Conditions," J.Am. Oil Chem. Soc. 1997, vol. 74, No. 3, pp. 249-254.
Isbell et al., "Optimization of the Sulfuric Acid-Catalyzed Estolide Synthesis from Oleic Acid," J.Am. Oil Chem. Soc. 1997, vol. 74, No. 4, pp. 473-476.
Isbell et al., "Characterization of Estolides Produced from the Acid-Catalyzed Condensation of Oleic Acid," J.Am. Oil Chem. Soc. 1994, vol. 71, No. 4, pp. 379-383.

* cited by examiner

*Primary Examiner*—Michael A Marcheschi
*Assistant Examiner*—Chantel Graham
(74) *Attorney, Agent, or Firm*—Grossman, Tucker et al.

(57) ABSTRACT

A biofuel containing an estolide ester, an ether ester, or a combination thereof. The estolide ester and ether ester can be of formula A:

$$R^1\text{---}CH(O\text{---}X)R^2CO_2R^3$$

wherein $R^1$ is an alkyl group having from 1 to 36 carbons, X is an alkyl group having from 1 to 10 carbons and preferably 1, 2, or 3 carbons or is an acyl group of formula $COR^5$ where $R^5$ is an alkyl group having 1 to 10 carbons and preferably 1, 2, or 3 carbons, $R^2$ is an alkylene group or alkenylene group having from 1 to 36 carbons, and $R^3$ is alkyl having 1 to 10 carbons and preferably 1, 2, or 3 carbons.

23 Claims, No Drawings

BIOFUEL

CROSS REFERENCE TO RELATED APPLICATIONS

The present application claims the benefit of the filing date of U.S. Provisional Patent Application Ser. No. 60/846,324, filed Sep. 21, 2006, the teachings of which are incorporated herein by reference.

BACKGROUND OF THE INVENTION

This invention pertains to methods and compositions employing biofuels composed of esters formed from the addition of a carboxylic acid via an estolide reaction or of an alcohol via alcoholysis over the double bond of unsaturated fatty acids, with the carboxylic acid groups either before or after addition across the double bond.

Over the past 20 years, alkyl mono-esters of fatty oils have been the subject of increasing research as an alternative fuel. While these fuels have certain attributes that have made them attractive, they nonetheless have several properties that are problematic. Two such problems are cold flow (low temperature) properties and oxidation stability. While additives have been proposed to improve both properties, concern remains. Solutions to these problems are highly desirable.

SUMMARY OF THE INVENTION

This invention provides a solution to one or more of the disadvantages and problems discussed above.

This invention relates to methods and compositions employing biofuels composed of esters formed from the addition of a carboxylic acid via an estolide reaction or of an ether via alcoholysis over the double bond of unsaturated fatty acids. Typically, the carboxylic acid groups of the unsaturated starting material are esterified after the alcoholysis or estolide reaction. Advantageously, the ethers and estolide esters of this invention exhibit improved cold flow (low temperature) properties, oxidation stability, or both.

In one broad respect, this invention is a biofuel containing an estolide ester, an ether ester, or a combination thereof. The biofuel may contain the estolide ester and ether ester of formula A:

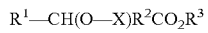

wherein $R^1$ is an alkyl group having from 1 to 36 carbons, X is an alkyl group having from 1 to 10 carbons and preferably 1, 2, or 3 carbons or is an acyl group of formula $COR^5$ where $R^5$ is an alkyl group having 1 to 10 carbons and preferably 1, 2, or 3 carbons, $R^2$ is an alkylene group or an alkenylene group having from 1 to 36 carbons, and $R^3$ is alkyl having 1 to 10 carbons and preferably 1, 2, or 3 carbons. It should be appreciated that it may not be necessary or desirable to convert all of the unsaturation in the starting material to saturated (alkylene) moieties, and thus the $R^2$ can be alkylene or alkenylene. In one respect, the biofuel is a diesel fuel and has been formulated for such use. In one embodiment, the biofuel is an ether ester such as of formula A:

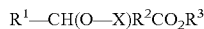

wherein $R^1$ is an alkyl group having from 1 to 36 carbons, X is an alkyl group having from 1 to 10 carbons and preferably 1, 2, or 3 carbons, $R^2$ is an alkylene group or an alkenylene group having from 1 to 36 carbons, and $R^3$ is alkyl having 1 to 10 carbons and preferably 1, 2, or 3 carbons. In another embodiment, the biofuel is an estolide ester of formula A:

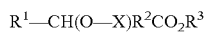

wherein $R^1$ is an alkyl group having from 1 to 36 carbons, X is an acyl group of formula $COR^5$ where $R^5$ is an alkyl group having 1 to 10 carbons and preferably 1, 2, or 3 carbons, $R^2$ is an alkylene group having from 1 to 36 carbons, and $R^3$ is alkyl having 1 to 10 carbons and preferably 1, 2, or 3 carbons.

In another broad respect, this invention is a method of combustion comprising: employing a biofuel as the fuel for an internal combustion engine. In yet another broad respect, this invention is a method of using an internal combustion engine, comprising: supplying a biofuel to the engine, and combusting the biofuel in the engine.

In addition, in one broad respect, this invention is a method of manufacturing a biofuel, comprising: formulating a fuel containing at least 0.1% of an ether ester, an estolide ester, or a combination thereof.

The starting material for the biofuel composition of this invention is a fatty acid alkyl ester or fatty acids that contain unsaturation in the aliphatic portion of the fatty acid.

In one embodiment, the fatty acid added across the double bond (olefin group) can be a short chain molecule such as formic acid or acetic acid. It is believed that use of such short chain fatty acids will have minimal effect on boiling point properties of the resulting modified biofuel.

Depending on the method used to perform this addition reaction, changes in how the biodiesel transesterification reaction is done may be required. For example, a vegetable oil may be acid-hydrolyzed, the glycerin removed, the estolide reaction then performed under similar acid-catalyzed conditions, and finally the esterification reaction (usually with methanol or ethanol) then done. This sequence should avoid the potential problem of undesirable cross esterification that might occur if the biofuel ester was directly reacted under acid-catalyzed conditions with formic or acetic acid.

Another approach that my be used is to add an alcohol across the biofuel olefin group (alcoholysis). This reaction is especially well behaved for short chain, primary alcohols such as methanol and ethanol. The reaction could take place under acid-catalyzed conditions. If the same alcohol is used as is present in the biodiesel ester (usually methanol), then mass action should substantially eliminate any unwanted reaction of the ester linkage in the feed in a more vigorous manner during an acid-catalyzed transesterification reaction and simultaneously perform both esterification and alcoholysis.

Since biofuel of this invention, like the fatty oil starting material, may contain a distribution of olefinic unsaturation, the extent to which those olefin groups would be saturated (either by estolide formation or alcoholysis) would need to be determined. It may not be necessary to react all olefin groups in order to affect significant improvements in cold flow properties and oxidation stability.

The biofuels of this invention may be generally represented by formula A:

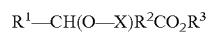

where $R^1$ is an alkyl group having from 1 to 36 carbons, X is an alkyl group having from 1 to 10 carbons and preferably 1, 2, or 3 carbons or is an acyl group of formula $COR^5$ where $R^5$ is an alkyl group having 1 to 10 carbons and preferably 1, 2, or 3 carbons, $R^2$ is an alkylene group or alkenylene group having from 1 to 36 carbons, and $R^3$ is alkyl having 1 to 10 carbons and preferably 1, 2, or 3 carbons. The alkyl, alkylene, and alkenylene groups may be straight chain, branched, or cyclic. It should be appreciated that mixtures of compounds of formula A are encompassed within the scope of this invention and that the term "biofuel" as used herein encompasses such mixtures of compounds. Likewise, it is possible that starting material contain multiple degrees of unsaturation or are mixtures that contain at least some starting material containing multiple degrees of unsaturation. There thus may be, for example, monoestolides or polyestolides.

DETAILED DESCRIPTION OF THE INVENTION

The terms "ether," "ester," "estolide ester," and the like are generally used herein to refer to products produced by esterifying the residual fatty acid (attachment of the $R^3$ group in Formula A) on the ether, estolide or estolide mixtures as described below. It is within the scope of this invention to start with an unsaturated fatty ester instead of an unsaturated fatty acid. Estolides are esters resulting from secondary ester linkages between fatty acid chains. Ethers are ethers resulting from ether linkages between a fatty acid and an alcohol.

The production of monoestolides and polyestolides by various routes is fully described in Isbell et al. (I) [JAOCS, Vol. 71, No. 1, pp. 169-174 (February 1994)], Erhan et al. [JAOCS, Vol. 74, No. 3, pp. 249-254 (1997)], Isbell et al. (II) [JAOCS, Vol. 74, No. 4, pp. 473-476 (1997)], and Isbell et al. (III) [JAOCS, Vol. 71, No. 1, pp. 379-383 (April 1994)], all of which are incorporated herein by reference. Isbell et al. (III) [JAOCS, Vol. 71, No. 1, pp. 379-383 (April 1994)], characterize the oleic estolides produced by acid catalysis as being a mixture of monoestolides and polyestolide oligomers up to eight or more fatty acid molecules interesterified through secondary ester linkages on the alkyl backbone. These publications also teach that the positions of these secondary ester linkages were centered around the original C-9 double bond position, with linkages actually ranging from positions C-5 to C-13 and most abundantly at the C-9 and C-10 positions in approximately equal amounts. Likewise, the remaining unsaturation on the terminal fatty acid was distributed along the fatty acid backbone, presumably also from C-5 to C-13. The linkages of the estolides of this invention can have, but do not necessarily have, the same or approximately the same distribution of linkages reported by Isbell et al., 1994. The ethers of this invention can be made using techniques well known to those of skill in the art, such as acid-catalyzed alcoholysis at a variety of temperatures and pressures. Therefore, it is to be understood that Formula A, supra, is a generalization of the estolide and ether backbone structure of the compounds contemplated herein, and that the formula is intended to encompass normal distributions of reaction products resulting from the various reaction procedures. In general, the unsaturated fatty acids (or esters) used as the starting materials in this invention have from 5 to 84 carbons, typically being common commercially available fatty acids. The fatty acids may contain one, two, or more degrees of unsaturation (one, two, or more double bonds).

Applicants believe that the superior properties of the subject ethers and estolide esters are dictated by the combination of the degree of oligomerization, decrease in level of unsaturation, the virtual absence of hydroxyl functionalities on the estolide and ether backbones, type of alcohol used to esterify the carboxylic acid moieties, length of the chain in the alcohol or fatty acid used to add across the double bonds, the nature of the specific ester moiety. The process of manufacturing the esters of this invention may introduce a distribution of secondary linkage positions in the estolide, which in general, affects low temperature and viscometric behavior. Minor components other than oleic acid, for example, such as linoleic acid or stearic acid may lead to variations in the basic estolide structure shown in Formula A.

The advantages of this invention are achieved by incorporating into the starting material an appropriate source of saturated fatty acids (including C-6 to C-14 fatty acids) or alcohols having from 1 to 10 carbons. The fatty acid source may be any isolated, saturated fatty acid or blends of individual fatty acids. Alternatively, the source may be any natural fat or oil having a high percentage of these acids, such as coconut oil, palm kernel oil, cuphea oil, and certain hydrogenated tallow or lard cuts. For example, the typical fatty acid composition of coconut oil is 49% lauric (C-12), 19% myristic (C-14), 9% palmitic (C-16), 7% stearic (C-18), 6.5% octanoic (C-8), 6% decanoic (C-10) and 3% oleic. Typically, the saturated component or components (carboxylic acid or alcohol or both) will be blended with the unsaturated carboxylic acid starting material in an unsaturated carboxylic acid:saturate ratio in the range of about 1:4 to about 4:1, with a preferred ratio in the range of 1:3 to 3:1, and more preferably in the range of about 2:1 to about 3:1. For purposes of the invention, any mixture of estolide and ether products resulting from a mixture of fatty acids or alcohol in the starting material as defined above should have at least about 50% of the unsaturation reacted to provide ethers and esters. More preferably, the percentage is within the range of 50-100% (i.e., essentially complete conversion of the unsaturation).

The ethers and estolides for use in making the biofuels of this invention can be recovered by any conventional procedure. Typically, the preponderance of low boiling monomer fraction (alcohols, unsaturated fatty acids and saturated fatty acids) is removed.

The ethers and estolides are esterified by normal procedures, such as acid-catalyzed or base-catalyzed reactions with an appropriate alcohol. The alcohol can have from 1 to 10 carbons, and can be straight-chain, branched, or cyclic. Preferred alcohols are ethanol and methanol, especially methanol.

Particularly contemplated within the scope of the invention are those ethers and esters which are characterized by oxidation stability index (using e.g. RANCIMAT EN14112), induction periods of greater than or equal to six hours, and pour points of less than or equal to 10 degrees Fahrenheit (using e.g. ASTM D97). Determination of these properties by conventional test procedures are routine. Therefore, identification of ethers and estolide esters within the scope of Formula A would be fully within the skill of the ordinary person in the art.

As previously indicated, the ethers and estolide esters of this invention have superior properties which render them useful as biofuels. In addition, the biofuels can be formulated to more desired properties such as boiling point, freezing point, boiling point distribution, viscosity, volatility, octane number, cetane number, and/or other ignition indices.

The biofuels can be used alone or in combination with other conventional fuels such as diesel, gasoline, ethanol; synthetic fuels, and the like. If combined with other fuels, the biofuels of this invention be used in an amount from 0.1% to 99.9% of the fuel composition as a whole. The biofuels typically contain from about 2.5% to about 25% of the ether and/or ester, and in one embodiment from about 5% to about 20%. In another embodiment, at least 50% of the fuel composition contains the ether and/or ester of this invention. In another embodiment of this invention, the biofuel contains from 95% to 100% of the ether ester or estolide ester or both, based on the total weight of the fuel. These biofuels can be made using standard techniques such as by admixing the conventional fuel with a given amount of ester or ether of this invention, with any optional additives.

In the preparation of biofuels, any of a variety of conventional fuel additives (especially diesel fuel additives) may optionally be incorporated into the biofuels in effective amounts. Illustrative of these additives are detergents, anti-wear agents, antioxidants, viscosity index improvers, pour point depressants, corrosion protectors, friction coefficient modifiers, colorants, antifoam agents, demulsifiers and the like. The expression "effective amount" as used herein is defined to mean any amount that produces a measurable effect for the intended purpose.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A biofuel containing an estolide ester, an ether ester, or a combination thereof, wherein the estolide ester and ether ester are of formula:

$$R^1\text{—CH(O—X)}R^2CO_2R^3$$

wherein $R^1$ is an alkyl group having from 1 to 36 carbons, X is an alkyl group having from 1 to 10 carbons or is an acyl group of formula $COR^5$ where $R^5$ is an alkyl group having 1 to 10 carbons, $R^2$ is an alkylene group or alkenylene group having from 1 to 36 carbons, and $R^3$ is alkyl having 1 to 10 carbons.

2. The biofuel of claim 1 that is a diesel fuel.

3. The biofuel of claim 1 wherein X in said formula is an alkyl group having from 1 to 10 carbons.

4. The biofuel of claim 1 wherein X in said formula is an acyl group of formula $COR^5$ where $R^5$ is an alkyl group having 1 to 10 carbons.

5. The biofuel of claim 1 wherein the biofuel contains from 0.1 to 99.9% of an ether ester, an estolide ester, or a combination thereof.

6. The biofuel of claim 1 wherein the biofuel contains about 2.5% to about 25% of an ether ester, an estolide ester, or a combination thereof.

7. The biofuel of claim 1 wherein the biofuel contains about 5% to about 20% of the ether ester, estolide ester, or combination thereof.

8. A method of combustion comprising: employing a biofuel as the fuel for an internal combustion engine, said biofuel containing an estolide ester, an ether ester, or a combination thereof, wherein the estolide ester and ether ester are of formula:

$$R^1\text{—CH(O—X)}R^2CO_2R^3$$

wherein $R^1$ is an alkyl group having from 1 to 36 carbons, X is an alkyl group having from 1 to 10 carbons and or is an acyl group of formula $COR^5$ where $R^5$ is an alkyl group having 1 to 10 carbons, $R^2$ is an alkylene group or alkenylene group having from 1 to 36 carbons, and $R^3$ is alkyl having 1 to 10 carbons.

9. A method of using an internal combustion engine, comprising:
supplying a biofuel to the engine, said biofuel containing an estolide ester, an ether ester, or a combination thereof, wherein the estolide ester and ether ester are of formula:

$$R^1\text{—CH(O—X)}R^2CO_2R^3$$

wherein $R^1$ is an alkyl group having from 1 to 36 carbons, X is an alkyl group having from 1 to 10 carbons or is an acyl group of formula $COR^5$ where $R^5$ is an alkyl group having 1 to 10 carbons, $R^2$ is an alkylene group or alkenylene group having from 1 to 36 carbons, and $R^3$ is alkyl having 1 to 10 carbons; and
combusting the biofuel in the engine.

10. The method of claim 9, wherein the engine is a diesel engine.

11. The method of claim 9, wherein X in said formula is an alkyl group having from 1 to 10 carbons.

12. The method of claim 9, wherein X in said formula is an acyl group of formula $COR^5$ where $R^5$ is an alkyl group having 1 to 10 carbons.

13. The method of claim 9, wherein the biofuel contains from 0.1 to 99.9% of an ether ester, an estolide ester, or a combination thereof.

14. The method of claim 9, wherein the biofuel contains from about 2.5% to about 25% of an ether ester, an estolide ester, or a combination thereof.

15. The method of claim 9, wherein the biofuel contains from about 5% to about 20% of the ether ester, estolide ester, or combination thereof.

16. A method of manufacturing a biofuel, comprising:
formulating a fuel containing at least 0.1% of an ether ester, an estolide ester, or a combination thereof, said biofuel containing an estolide ester, an ether ester, or a combination thereof, wherein the estolide ester and ether ester are of formula:

$$R^1\text{—CH(O—X)}R^2CO_2R^3$$

wherein $R^1$ is an alkyl group having from 1 to 36 carbons, X is an alkyl group having from 1 to 10 carbons or is an acyl group of formula $COR^5$ where $R^5$ is an alkyl group having 1 to 10 carbons, $R^2$ is an alkylene group or alkenylene group having from 1 to 36 carbons, and $R^3$ is alkyl having 1 to 10 carbons.

17. The method of claim 16, wherein the biofuel contains at least about 2.5% of the ether ester, estolide ester, or combination thereof.

18. The method of claim 16, wherein the biofuel is formulated for a diesel engine.

19. The method of claim 16, wherein X in said formula is an alkyl group having from 1 to 10 carbons.

20. The method of claim 16, wherein X in said formula is an acyl group of formula $COR^5$ where $R^5$ is an alkyl group having 1 to 10 carbons.

21. The method of claim 16, wherein the biofuel contains from 0.1 to 99.9% of an ether ester, an estolide ester, or a combination thereof.

22. The method of claim 16, wherein the biofuel contains from about 2.5% to about 25% of an ether ester, an estolide ester, or a combination thereof.

23. The method of claim 16, wherein the biofuel contains from about 5% to about 20% of the ether ester, estolide ester, or combination thereof.

* * * * *